United States Patent
Krause et al.

(10) Patent No.: US 11,496,042 B2
(45) Date of Patent: Nov. 8, 2022

(54) METHOD AND DEVICE FOR MATCHING THE VOLTAGE OF THE SMOOTHING CAPACITOR OF A DC/DC CONVERTER BEFORE A HIGH-VOLTAGE BATTERY IS CONNECTED

(71) Applicant: BRUSA HyPower AG, Sennwald (CH)

(72) Inventors: Axel Krause, Nesslau (CH); Nicolae Daniel Bolohan, Buchs (CH)

(73) Assignee: BRUSA HyPower AG, Sennwald (CH)

( * ) Notice: Subject to any disclaimer, the term of this patent is extended or adjusted under 35 U.S.C. 154(b) by 0 days.

(21) Appl. No.: 17/265,730

(22) PCT Filed: Aug. 30, 2019

(86) PCT No.: PCT/EP2019/073223
§ 371 (c)(1),
(2) Date: Feb. 3, 2021

(87) PCT Pub. No.: WO2020/043883
PCT Pub. Date: Mar. 5, 2020

(65) Prior Publication Data
US 2021/0175793 A1    Jun. 10, 2021

(30) Foreign Application Priority Data
Aug. 31, 2018 (DE) ...................... 10 2018 121 268.2

(51) Int. Cl.
*B60L 50/52* (2019.01)
*H02H 11/00* (2006.01)
(Continued)

(52) U.S. Cl.
CPC ............... *H02M 1/32* (2013.01); *B60L 50/52* (2019.02); *H02H 9/001* (2013.01);
(Continued)

(58) Field of Classification Search
USPC ........................................................ 307/10.7
See application file for complete search history.

(56) References Cited

U.S. PATENT DOCUMENTS

| 2005/0047175 A1 | 3/2005 | Kawasaki et al. |
| 2008/0013346 A1* | 1/2008 | Westmoreland ...... H02M 3/337 363/37 |

(Continued)

FOREIGN PATENT DOCUMENTS

EP    2159908 A2    3/2010

OTHER PUBLICATIONS

English-language translation of the International Preliminary Report on Patentability issued in International Application No. PCT/EP2019/073223 dated Mar. 11, 2021.

*Primary Examiner* — Rexford N Barnie
*Assistant Examiner* — Xuan Ly
(74) *Attorney, Agent, or Firm* — Hoffmann & Baron, LLP

(57) ABSTRACT

The invention relates to a method and to a device for operating a bidirectional voltage transformer connectable to a primary battery and having a primary-side smoothing capacitor, an inductive transformer, and a secondary-side clamping capacitor, wherein, before the primary battery is connected, a voltage at the primary-side smoothing capacitor is matched to a voltage of the primary battery by a cyclical transfer of charge from the secondary-side clamping capacitor. The voltage of the primary-side smoothing capacitor is matchable in this way to the voltage of the primary battery before the primary battery is connected, and current spikes thus avoided during connection of the primary battery.

11 Claims, 4 Drawing Sheets

(51) Int. Cl.
*H02H 9/00* (2006.01)
*H02M 1/32* (2007.01)
*H02M 3/335* (2006.01)

(52) U.S. Cl.
CPC ...... *H02H 11/006* (2013.01); *H02M 3/33584* (2013.01); *H02M 3/33592* (2013.01); *B60L 2210/10* (2013.01); *H02M 1/322* (2021.05)

(56) References Cited

U.S. PATENT DOCUMENTS

| | | | |
|---|---|---|---|
| 2014/0092639 A1 | 4/2014 | Shimada et al. | |
| 2015/0263633 A1* | 9/2015 | Shono | H02M 1/36 363/17 |
| 2018/0034360 A1 | 2/2018 | Hirabayashi | |

* cited by examiner

METHOD AND DEVICE FOR MATCHING THE VOLTAGE OF THE SMOOTHING CAPACITOR OF A DC/DC CONVERTER BEFORE A HIGH-VOLTAGE BATTERY IS CONNECTED

CROSS-REFERENCE TO RELATED APPLICATIONS

The present application is the U.S. National Phase of PCT/EP2019/073223, filed on Aug. 30, 2019, which claims priority to German Patent Application No. 10 2018 121 268.2, filed on Aug. 31, 2018, the entire contents of which are incorporated herein by reference.

BACKGROUND

Field

The invention relates to a method for operating a bidirectional voltage transformer which can be connected to a primary battery, having a smoothing capacitor on the primary side, an inductive transformer, and a clamping capacitor on the secondary side, as well as to a device designed for this purpose.

Related Art

In the case of drive devices having a primary battery and having a DC/DC voltage transformer that can be connected to and disconnected from the primary battery, the DC/DC voltage transformer is used to convert the typically high voltage of the primary battery (200-800V) to a lower DC voltage. In this way, particularly if it is installed in an electric vehicle, the low voltage (12-24V) required for the on-board network can be obtained from the primary battery.

Such a device including a primary battery and a DC/DC voltage transformer that can be connected to it is known from EP 2 159 908 B1. It substantially consists of an inductive transformer, which is coupled with the primary battery on the primary side by means of a MOSFET full-bridge circuit. The voltage is rectified on the secondary side. With such a circuit, it is possible to convert the voltage with a high degree of efficiency; this operating mode is called "buck mode."

However, it is also possible to operate such a DC/DC voltage transformer in reverse—that is to say, to transfer energy from the secondary side to the primary side—which is referred to as boost operation.

For various reasons, it is necessary to disconnect the primary battery from the remaining high-voltage bus, which also includes the DC/DC voltage transformer, and/or to reconnect it afterward. In such a case it is desirable for the voltage of the primary-side smoothing capacitor to correspond as closely as possible to the voltage of the primary battery in order to avoid high inrush currents in the switch.

SUMMARY

The object of the invention is to provide a method by means of which the primary-side smoothing capacitor can be adapted to the voltage of the primary battery before the primary battery is connected. This should preferably be done without the use of additional components.

The invention results from the features of the independent claims. Advantageous further refinements and embodiments are the subject of the dependent claims. Further features, potential applications, and advantages of the invention result from the following description and from the explanation of embodiments of the invention, which are shown in the drawings.

The object is achieved in that, before the primary battery is connected, the voltage on the primary-side smoothing capacitor is matched to the voltage of the primary battery by means of a cyclical transfer of charge from the clamping capacitor.

With the method according to the invention, the primary-side smoothing capacitor is charged very quickly, in a very short period of 0.2 seconds, by way of example, from a discharged state to the primary battery voltage of several hundred volts. To this end, the invention utilizes the series resonance of the clamping capacitor with the leakage inductance of the transformer in order to limit the current through the semiconductor switch and to achieve optimal switching conditions.

This results in the following advantageous effects:
- the current flowing through the switches is limited by the series resonance of the clamping capacitor and the leakage inductance,
- the synchronous rectifier formed by switches QS1 and QS3 is only switched on or off at very low currents, which leads to low switching losses,
- the EMF emissions are low,
- the switching device does not require any additional components,
- it is easy to regulate the switch-on time. Small deviations in the resonance frequency due to component tolerances hardly affect the performance of the method.

According to an advantageous development of the invention, the length of the charge cycles is set as half of the period of a series resonance of the clamping capacitor with the leakage inductance. This makes it possible, using the resonance behavior of the two components mentioned, to achieve an optimal transfer of the energy that can be stored in the clamping capacitor to the smoothing capacitor, and to bring the latter to the voltage of the primary battery through cyclical charging steps.

According to an advantageous development of the invention, the smoothing capacitor charging process is terminated when the voltage difference between the smoothing capacitor and the primary battery falls below a threshold value, for example 10V. This ensures that the charging cycle is repeated until the smoothing capacitor has a sufficiently high voltage, and until sufficiently low currents flow when the primary battery is subsequently connected.

According to an advantageous development of the invention, the DC/DC converter has the following structure:
- the voltage transformer has an inductive transformer with a primary winding and a split secondary winding with a leakage inductance,
- a first terminal of the primary winding can be connected to the negative primary voltage terminal via a first switch, and to the positive primary voltage terminal via a second switch,
- a second terminal of the primary winding can be connected to the negative primary voltage terminal via a third switch, and to the positive primary voltage terminal via a fourth switch,
- the two end terminals of the secondary winding can be connected to a negative secondary voltage terminal via a fifth and a sixth switch,
- the two end terminals of the secondary winding can also be connected to a clamping capacitor via a seventh and an eighth switch, a center terminal of the split secondary winding is connected to a positive secondary voltage terminal via a smoothing inductor on the secondary side, the secondary voltage terminals are connected to a secondary battery.

The following method is carried out by means of such a device:

during a first period of time (T0-T1), the seventh and sixth switches are conductive, such that a discharge current of the clamping capacitor flowing through the secondary coil generates a charging current of the smoothing capacitor on the primary side via the second and third switch, wherein the duration of the first period of time (T0-T1) corresponds to half an oscillation period of a series resonance of the clamping capacitor and the leakage inductance;

during a second time period (T1-T2), the seventh and eighth switches are conductive, such that the clamping capacitor is charged by the positive secondary voltage terminal via the smoothing inductor of the secondary battery;

during a third time period (T2-T3), the first and fourth switches and the fifth and eighth switches are conductive, such that a discharge current of the clamping capacitor flowing through the secondary coil generates a charging current of the smoothing capacitor on the primary side;

during a fourth time period (T3-T4), the switch positions correspond to those of the second period (T1-T2).

BRIEF DESCRIPTION OF THE DRAWINGS

Further advantages, features, and details result from the following description, in which—if necessary with reference to the drawings—at least one embodiment is described in detail. Identical, similar, and/or functionally identical parts are provided with the same reference signs.

In the drawings.

DETAILED DESCRIPTION

Figure 1:
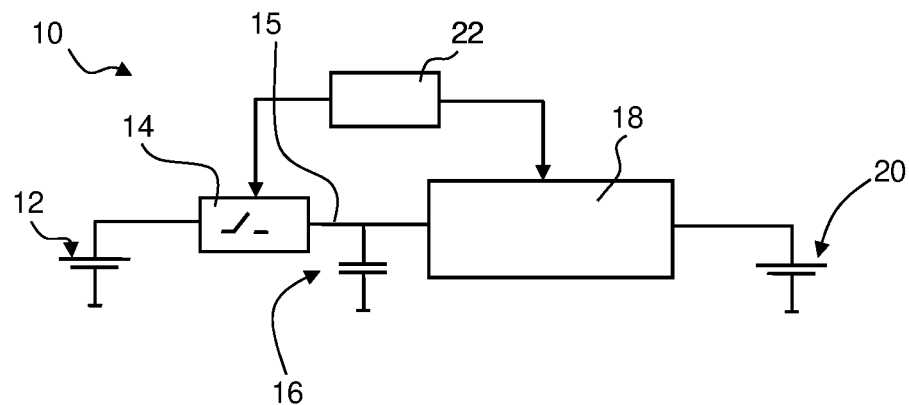
FIG. 1 shows a block diagram of a battery/transformer system.

FIG. 1 shows a block diagram of a battery/transformer system 10 which substantially consists of a high-voltage primary battery 12, a relay switch 14, a high-voltage bus 15 with a primary-side smoothing capacitor 16, a DC/DC converter 18, and a low-voltage secondary battery 20. A control device 22 controls the semiconductor switches in the DC/DC converter 18, which are described further below and which are preferably designed as MOSFET switches, as well as the relay switch 14. The high-voltage bus 15 is also connected to an electric motor (not shown) driven by the primary battery 12. The smoothing capacitor 16 serves to reduce the ripple of the primary/high voltage.

Initially, the relay switch 14 is blocked in the non-operative state, such that no voltage is applied to the high-voltage bus 15, and thus no voltage is applied to the smoothing capacitor 16. A suitable voltage detector can be installed in the relay switch 14 to detect the voltage difference between the primary battery 12 and the high-voltage bus 15.

Figure 2:
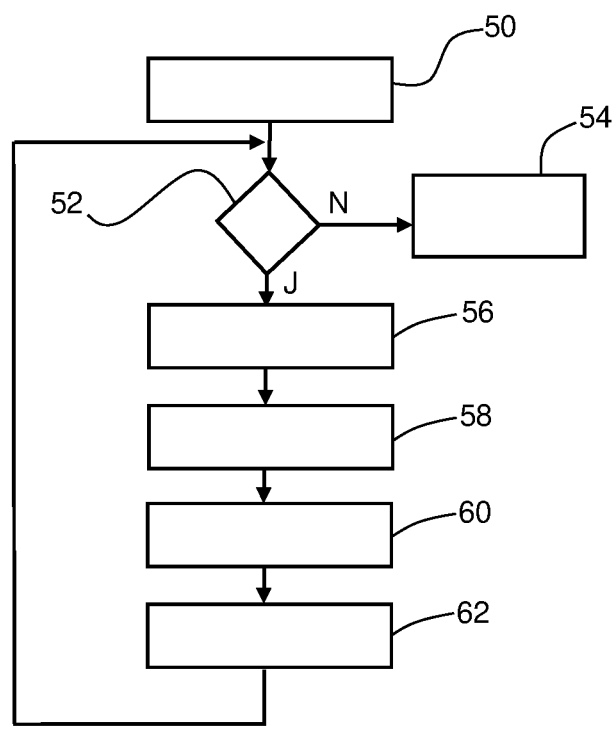
FIG. 2 shows a flowchart of the method according to the invention.

Reference is now made to FIG. 2. If, in accordance with step 50, the connection of the primary battery 12 to the high-voltage bus 15 will be carried out by the control device 22 (in order to start the electric motor), then step 52 involves verifying whether the differential voltage between the primary battery 12 and the smoothing capacitor 16 exceeds a threshold value, for example 10V. If this is not the case, the relay switch 14 is closed in step 54, and the connection between the primary battery 12 and the DC/DC converter 18 is thus established. The control device 22 thus switches the DC/DC converter 18 into the normal operating mode (so-called buck mode) in which the low-voltage secondary battery 20 is charged.

Otherwise, the control device 22 operates the DC/DC converter 18 within the (precharging) method, according to the invention, of charging the smoothing capacitor 16 (steps 56-62) until the control device 22 determines, in step 52, that the charging of the smoothing capacitor 16 by means of the secondary battery 20 has resulted in a drop below the voltage threshold value at the relay switch 14—that is, the smoothing capacitor 16 is almost charged to the voltage of the primary battery 12.

A third operating mode of the DC/DC converter 18 is also possible in which the high-voltage bus 15 can be provided with voltage by means of the low-voltage secondary battery 20 (so-called boost mode).

Figure 3:
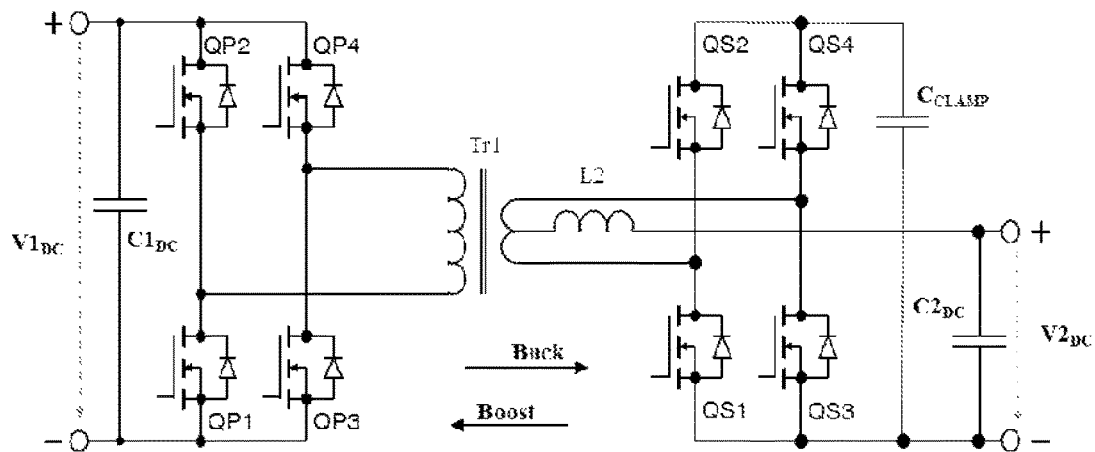
FIG. 3 shows a circuit of a DC/DC converter.

The circuit of the DC/DC converter 18 is shown in FIG. 3. This includes an inductive transformer Tr1 with a primary coil, as well as a secondary coil with a center tap on the secondary side. On its primary side, which is arranged on the left in the picture, the smoothing capacitor $C1_{DC}$ (indicated by reference number 16 in FIG. 1) can be seen next to the primary voltage terminals (+) and (−) for connection to the high-voltage bus 15 shown in FIG. 1. The two terminals of the primary winding of the transformer $T_{r1}$ are connected to the primary voltage terminals (+) and (−) by means of an H-bridge or full bridge made up of a first MOSFET switch QP1, a second MOSFET switch QP2, a third MOSFET switch QP3 and a fourth MOSFET switch QP4, each of which includes body diodes. The smoothing capacitor $C1_{DC}$ typically has a capacitance of about 1-2 mF.

On the secondary side of the transformer $T_{r1}$, the external terminals of the secondary winding are connected via a fifth MOSFET switch QS1 and a sixth MOSFET switch QS3 to a secondary-side negative secondary voltage terminal (−). The external terminals of the secondary winding are also connected to a terminal of a clamping capacitor $C_{clamp}$ via a seventh MOSFET switch QS2 and an eighth MOSFET switch QS4. The other terminal of the clamping capacitor $C_{clamp}$ is also connected to the negative secondary voltage terminal (−). The center tap of the secondary winding of the transformer $T_{r1}$ is connected via a smoothing inductor L2 to a secondary-side smoothing capacitor $C2_{DC}$. The secondary voltage terminals (+) and (−) can be connected to the secondary battery 20 shown in FIG. 1.

Figure 4:
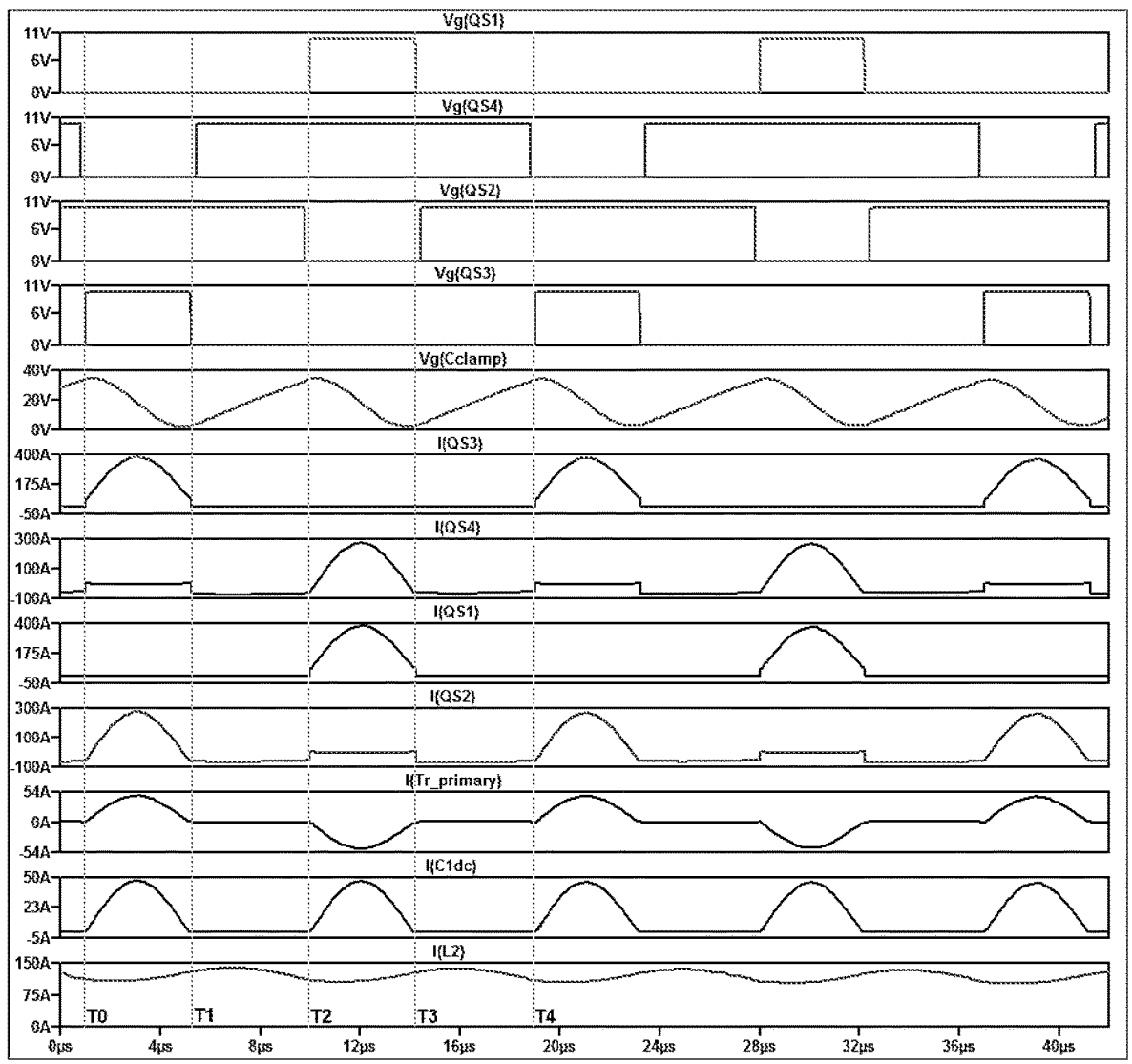
FIG. 4 shows a waveform diagram of the method according to the invention and FIGS. 5-8 show the circuit according to FIG. 1, with currents marked in different charging cycle phases.

The waveform diagram of FIG. 4 shows, for the four time intervals T0-T1, T1-T2, T2-T3, T3-T4, from top to bottom, the voltages at the switches QS1, QS2, QS3, QS4, at the clamping capacitor $C_{clamp}$, the currents through the switches QS3, QS4, QS1, QS2, through the primary winding of the transformer $T_{r1}$, through the smoothing capacitor $C1_{DC}$, and through the smoothing inductor L2.

The four time intervals according to steps 56-62 of FIG. 2, of the (precharging) method according to the invention, are explained below.

Figure 5:
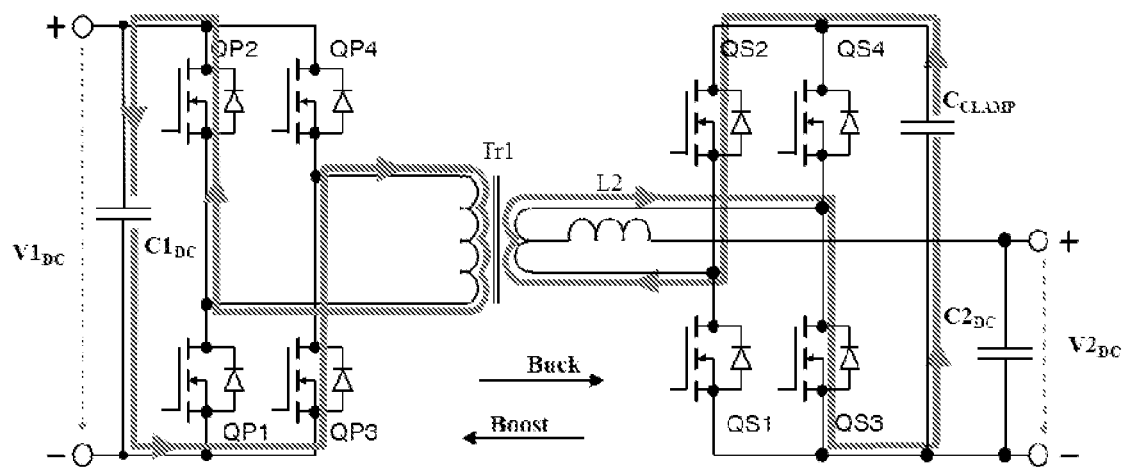

FIG. 5 shows the switching state in step 56, which in the waveform diagram of FIG. 4 corresponds to a first time interval between times T0 and T1; the flow of current is shown by bold lines. During the time interval T0-T1, the secondary-side switches QS2 and QS3 are conductive, while the switches QS1 and QS4 are blocked. On the primary side, all MOSFET switches can be blocked since the current can flow via the body diodes of switches QP2 and QP3. However, it is also possible to close the switches QP2 and QP3 on the primary side in order to reduce losses.

Starting from a state in which the smoothing capacitor C1 Dc is discharged and the clamping capacitor $C_{clamp}$ is charged, its charge flows via the switch QS2, the entire secondary winding of the transformer $T_{r1}$ and the switch QS3. The current induced in the primary winding charges the smoothing capacitor C1$_{DC}$ via switches QP2 and QP3 and/or their body diodes.

As can be seen in the waveform diagram for the switch QS3 (diagram 6 from above in FIG. 4), the current initially increases, due to the series resonance of the clamping capacitor $C_{clamp}$ with a leakage inductance $L_{leak}$ of the transformer $T_{r1}$, according to a sine half-wave up to the middle of the time interval T0-T1, and then drops again afterward. At the end of this time interval T0-T1, the voltage at the clamping capacitor $C_{clamp}$ has dropped almost to 0V (diagram 5 in FIG. 4). Since a current through the smoothing inductor L2 is evenly divided between both winding portions of the secondary coil of the transformer $T_{r1}$, the smoothing inductor L2 does not contribute to the resonance discussed above.

The duration of the time interval T0-T1 is determined based on the resonance frequency, which in turn depends on the capacitance of the clamping capacitor $C_{clamp}$ and the leakage inductance $L_{leak}$; or, conversely, the required capacitance of the clamping capacitor $C_{clamp}$ is determined based on a desired switching frequency, for example 60 kHz.

For example, to charge a smoothing capacitor C1$_{DC}$ with a capacitance of 2 mF to an assumed voltage of the primary battery 12 of 475V, about 225 kJ of energy is required. Assuming an efficiency of 90%, the capacitance of the clamping capacitor $C_{clamp}$ is found as:

$$Cclamp := \frac{\left(\frac{Chv \cdot Vcaphv^2}{2}\right)}{\left(\frac{Fswpre \cdot 2 \cdot tcharge}{npre}\right) \cdot \frac{Vclamp^2}{2}}$$

$$Cclamp = 13.8138 \ \mu F$$

where:
Chv=2 mF capacity of the smoothing capacitor C1$_{DC}$
Vcaphv=475V primary battery voltage
Fswpre=60 kHz switching frequency
Tcharge=0.2 s time to charge the smoothing capacitor C1$_{DC}$ to Vcaphv
Hpre=90% efficiency
Vclamp=35V initial voltage at the clamping capacitor $C_{clamp}$ A typical capacitance of the clamp capacitor $C_{clamp}$ is 20 μF, to compensate for tolerances and voltage drops of resistive components. If a higher switching frequency is selected, the capacitance $C_{clamp}$ can be selected as a lower value.

The resonance frequency is thus determined according to:

$$F\_res := \frac{1}{\left(2 \cdot \pi \cdot \sqrt{Cclamp \cdot L\_l\_sec}\right)}$$

Where "L_l_sec" is the leakage inductance $L_{leak}$ of the transformer for the two sub-portions of the secondary winding in series. The leakage inductance $L_{leak}$ must be selected in such a manner that the peak current is less than the rated current of the secondary-side switches QS1-QS4. An optimal value for L_l_sec/$L_{leak}$ is approximately 90 nH. This results in a resonance frequency of approximately 117 kHz.

According to an advantageous refinement, if the transformer $T_r$ cannot be designed with a suitably high leakage inductance, an additional matching inductor can be connected in series with the primary winding of the transformer $T_r$.

Figure 6:
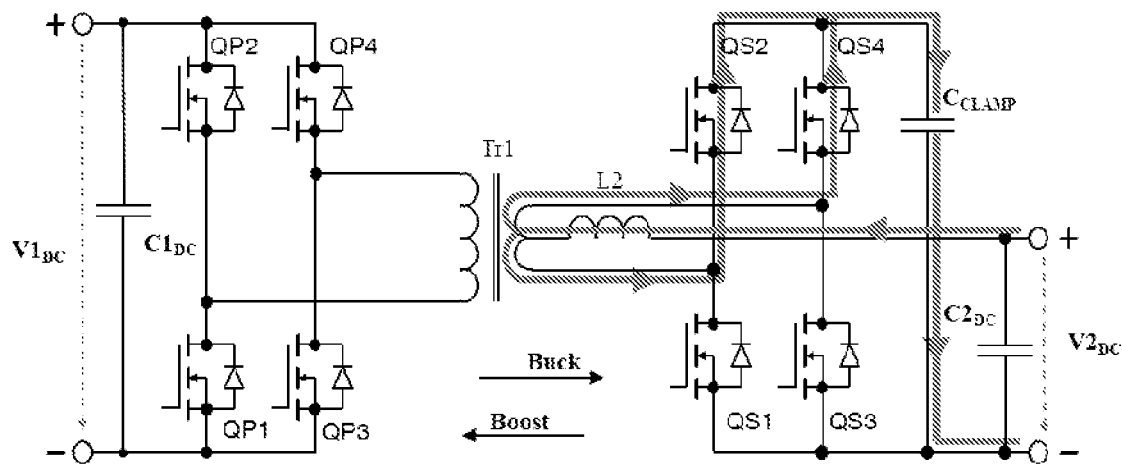

FIG. 6 shows the switching state in step 58, which corresponds to a second time interval between times T1 and T2 in the waveform diagram of FIG. 4, wherein the current flow is once again shown by bold lines.

At time T1, switch QS3 is opened, such that now the clamping capacitor $C_{clamp}$ is charged with the secondary voltage V2$_{DC}$ via the low-voltage secondary battery 20 (FIG. 1) connected to the secondary (+) and (−) terminals. The current flows through the smoothing inductor L2 from the center tap of the secondary winding over both winding halves in opposite directions; as such, the induced magnetic fields cancel each other and thus no voltage is induced on the primary side of the transformer $T_{r1}$. In order to keep the two partial currents actually equal, and the losses low, it is useful if switch QS4 is switched to the conductive state and the corresponding partial current does not have to flow through its body diode. In the fifth waveform diagram in FIG. 3, it can be seen how the voltage at the clamping capacitor $C_{clamp}$ rises again during this time interval T1-T2.

Figure 7:
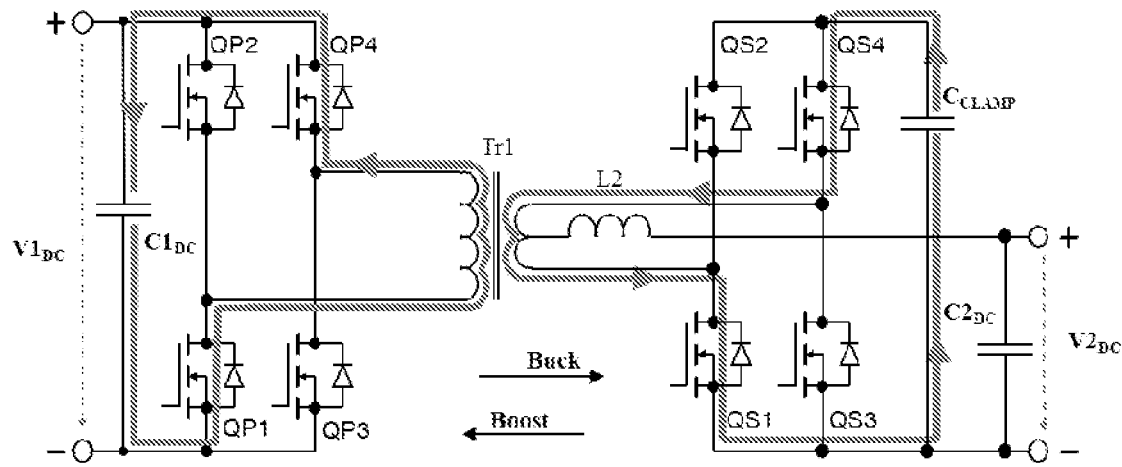

FIG. 7 shows the switching state in step 60 which, in the waveform diagram of FIG. 4, corresponds to a third time interval between times T2 and T3, wherein the current flow is again shown by bold lines.

In this time interval T2-T3, the secondary-side switch QS2 is open and QS1 is conductive, and the switch QS4 remains conductive (such that, analogously to the first time interval T0-T1, the clamping capacitor $C_{clamp}$ is discharged again—only the current flows through the secondary winding of the transformer $T_{r1}$ in the opposite direction. In this way, analogously to the first time interval T0-T1, a current is induced on the primary side, which flows in the opposite direction as in the first time interval T0-T1. The smoothing capacitor C1$_{DC}$ is charged again by means of this current—specifically at least via the body diodes of the two primary-side switches QP1 and QP4, which can also be conductive to reduce losses. At time T3, the voltage on the clamping capacitor $C_{clamp}$ has dropped again to almost zero.

Figure 8:
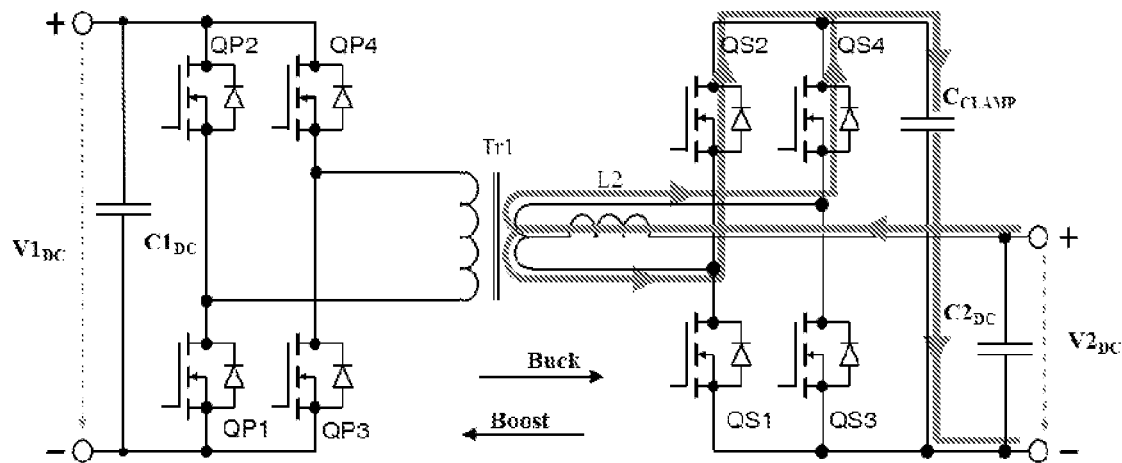

FIG. 8 shows the switching state in step 62 which, in the waveform diagram of FIG. 4, corresponds to a fourth time interval between times T3 and T4, wherein the current flow is again shown by bold lines. In this time interval T3-T4, the secondary-side switch QS1 is open and the clamping capacitor $C_{clamp}$ is recharged in a manner identical to the second time interval T1-T2 described above.

Another charging cycle then takes place with steps 58-62.

Although the invention has been illustrated and explained in greater detail by means of preferred embodiments, the invention is not limited by the disclosed examples and other variations may be derived therefrom by a person skilled in the art without departing from the scope of protection of the invention. It is therefore clear that there are a plurality of possible variations. It is also clear that embodiments cited by way of example actually only constitute examples that are not to be interpreted in any way as a limitation of the scope, of the potential applications, or of the configuration of the invention. Instead, the preceding description and the description of the figures allow the person skilled in the art to specifically implement the embodiments, wherein the person skilled in the art has knowledge of the disclosed inventive concept and is able to make numerous changes, for example, with respect to the function or the arrangement of individual elements cited in an embodiment, without departing from the scope of protection, which is defined by the claims and their legal equivalents, such as a further explanation in the description.

LIST OF REFERENCE SIGNS

10 Battery/converter system
12 Primary battery
14 Relay switch
15 High-voltage bus
16 Smoothing capacitor
18 DC/DC converter
20 Secondary battery
22 Control device
50-62 steps
$C_{clamp}$ Clamp capacitor
$C1_{DC}$ Smoothing capacitor
$L_{leak}$. Leakage inductance of the transformer
L2 Smoothing inductance
QP1 . . . 4 MOSFET switch
QS1 . . . 4 MOSFET switch
$T_{r1}$ Transformer
T0-T1 Time interval
T1-T2 Time interval
T2-T3 Time interval
T3-T4 Time interval

The invention claimed is:

1. A method of operating a bidirectional voltage transformer connectable to a primary battery, the bidirectional voltage transformer comprising a primary-side smoothing capacitor, an inductive transformer, and a secondary-side clamping capacitor, wherein the inductive transformer has a primary winding and a split secondary winding with a leakage inductance,
   a first terminal of the primary winding is connectable to a negative primary voltage terminal via a first switch and to a positive primary voltage terminal via a second switch,
   a second terminal of the primary winding is connectable to the negative primary voltage terminal via a third switch and to the positive primary voltage terminal via a fourth switch,
   the two end terminals of the secondary winding are connectable to a negative secondary voltage terminal via a fifth and a sixth switch,
   the two end terminals of the secondary winding are also connectable to the clamping capacitor via a seventh and an eighth switch,
   a center terminal of the split secondary winding is connected to a positive secondary voltage terminal via a smoothing inductor on a secondary side, and
   the secondary voltage terminals are connected to a secondary battery, wherein the method comprises:
   before the primary battery is connected, matching a voltage at the primary-side smoothing capacitor to a voltage of the primary battery by a cyclical transfer of charge from the clamping capacitor; and
   carrying out in cycles following operations:
      during a first period of time, making the seventh and sixth switches conductive, such that a discharge current of the clamping capacitor flowing through the secondary coil generates a charging current of the smoothing capacitor via the second and third switches on a primary side, wherein a duration of the first period corresponds to half an oscillation period ($\pi$) of a series resonance of the clamping capacitor and the leakage inductance;
      during a second period, making the seventh and eighth switches conductive, such that the clamping capacitor is charged by the positive secondary voltage terminal via the smoothing inductor of the secondary battery;
      during a third period, making the first and fourth switches and the fifth and eighth switches conductive, such that a discharge current of the clamping capacitor flowing through the secondary coil generates a charging current of the smoothing capacitor on the primary side; and
      during a fourth time period, making the switch positions correspond to those of the second period.

2. The method according to claim 1, wherein the method comprises determining a length of charge cycles as half a period of a series resonance of the clamping capacitor with a leakage inductance.

3. The method according to claim 1, wherein the method comprises ending a charging process of the smoothing capacitor when a voltage difference between the smoothing capacitor and the primary battery falls below a threshold value.

4. The method according to claim 1, wherein a duration of the third time period corresponds to a duration of the first time period.

5. A device comprising:
   a bidirectional voltage transformer connectable to a primary battery, the bidirectional voltage transformer comprising a primary-side smoothing capacitor, an inductive transformer, and a secondary-side clamping capacitor, wherein the inductive transformer has a primary winding and a split secondary winding with a leakage inductance,
   a first terminal of the primary winding is connectable to a negative primary voltage terminal via a first switch and to a positive primary voltage terminal via a second switch,
   a second terminal of the primary winding is connectable to the negative primary voltage terminal via a third switch and to the positive primary voltage terminal via a fourth switch,
   the two end terminals of the secondary winding are connectable to a negative secondary voltage terminal via a fifth and a sixth switch,
   the two end terminals of the secondary winding are also connectable to the clamping capacitor via a seventh and an eighth switch, a center terminal of the split secondary winding is connected to a positive secondary voltage terminal via a smoothing inductor on a secondary side, and the secondary voltage terminals are connected to a secondary battery;

a relay switch configured to connect the primary battery; and a control unit configured to control the relay switch and a plurality of switches in the bidirectional voltage transformer such that before the primary battery is connected, a voltage at the primary-side smoothing capacitor is matched to a voltage of the primary battery by a cyclical transfer of charge from the clamping capacitor, wherein the control unit is configured to carry out in cycles following operations:

during a first period of time, making the seventh and sixth switches conductive, such that a discharge current of the clamping capacitor flowing through the secondary coil generates a charging current of the smoothing capacitor via the second and third switches on a primary side, wherein a duration of the first period corresponds to half an oscillation period ($\pi$) of a series resonance of the clamping capacitor and the leakage inductance;

during a second period, making the seventh and eighth switches conductive, such that the clamping capacitor is charged by the positive secondary voltage terminal via the smoothing inductor of the secondary battery;

during a third period, making the first and fourth switches and the fifth and eighth switches conductive, such that a discharge current of the clamping capacitor flowing through the secondary coil generates a charging current of the smoothing capacitor on the primary side; and during a fourth time period, making the switch positions correspond to those of the second period.

6. The device according to claim 5, wherein the plurality of switches is designed as a plurality of MOSFET switches with body diodes.

7. The device according to claim 6, wherein the control unit is configured to block a combination of two MOSFET switches selected from the plurality of MOSFET switches, causing the MOSFET switches that are blocked to act as body diodes.

8. The device according to claim 5, wherein the device comprises a matching inductor connected in series with a primary winding of the bidirectional voltage transformer.

9. The device according to claim 5, wherein the control unit is configured to determine a length of charge cycles as half a period of a series resonance of the clamping capacitor with a leakage inductance.

10. The device according to claim 5, wherein the control unit is configured to end a charging process of the smoothing capacitor when a voltage difference between the smoothing capacitor and the primary battery falls below a threshold value.

11. The device according to claim 5, wherein a duration of the third time period corresponds to a duration of the first time period.

* * * * *